(12) United States Patent
Kavallierou

(10) Patent No.: US 11,330,150 B2
(45) Date of Patent: May 10, 2022

(54) VIDEO CONTENT SYNCHRONISATION METHOD AND APPARATUS

(71) Applicant: Sony Interactive Entertainment Inc., Tokyo (JP)

(72) Inventor: Michael A. Kavallierou, Burgess Hill (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/343,092

(22) PCT Filed: Oct. 4, 2017

(86) PCT No.: PCT/GB2017/052970
§ 371 (c)(1),
(2) Date: Apr. 18, 2019

(87) PCT Pub. No.: WO2018/078319
PCT Pub. Date: May 3, 2018

(65) Prior Publication Data
US 2020/0053253 A1 Feb. 13, 2020

(30) Foreign Application Priority Data
Oct. 25, 2016 (GB) ..................................... 1618028

(51) Int. Cl.
*G06F 3/14* (2006.01)
*H04N 5/04* (2006.01)
*H04N 5/93* (2006.01)

(52) U.S. Cl.
CPC ............. *H04N 5/04* (2013.01); *G06F 3/1423* (2013.01); *H04N 5/9305* (2013.01)

(58) Field of Classification Search
CPC . G06F 3/04842; G06F 3/1454; G02B 27/017; G06T 19/006
See application file for complete search history.

(56) References Cited

U.S. PATENT DOCUMENTS 8,978,075 B1 * 3/2015 Kaiser ................ H04N 5/44591
725/62
10,078,917 B1 * 9/2018 Gaeta .................... G06T 15/503
(Continued)

FOREIGN PATENT DOCUMENTS

EP 3054690 A1 8/2016
JP 2005333371 A 12/2005
(Continued)

OTHER PUBLICATIONS

Examination Report for corresponding GB Application No. GB1618028.3, 2 pages, dated Sep. 13, 2019.
(Continued)

*Primary Examiner* — Samantha (Yuehan) Wang
(74) *Attorney, Agent, or Firm* — Matthew B. Dernier, Esq.

(57) ABSTRACT

A method of video content synchronisation includes the steps of displaying a video content item on a first display, generating a virtual environment separate from the video content item for display, detecting a predetermined cue associated with a predetermined time in the playback of the video content item, and displaying at least part of the virtual environment, but not on the first display, where the displayed state of the at least part of the virtual environment changes in response to the detected predetermined cue.

12 Claims, 3 Drawing Sheets

(56) References Cited

U.S. PATENT DOCUMENTS

| | | | |
|---|---|---|---|
| 10,484,824 B1* | 11/2019 | Gaeta | H04M 1/72527 |
| 2011/0138416 A1* | 6/2011 | Kang | H04N 21/42208 |
| | | | 725/39 |
| 2012/0249424 A1* | 10/2012 | Bove | A63F 13/211 |
| | | | 345/158 |
| 2013/0328762 A1* | 12/2013 | McCulloch | G06F 3/017 |
| | | | 345/156 |
| 2014/0031120 A1* | 1/2014 | Mallinson | A63F 13/92 |
| | | | 463/31 |
| 2014/0282677 A1 | 9/2014 | Mantell | |
| 2014/0304233 A1* | 10/2014 | Belaunde | G06F 16/70 |
| | | | 707/661 |
| 2014/0317659 A1* | 10/2014 | Yasutake | H04N 21/43615 |
| | | | 725/43 |
| 2015/0070391 A1* | 3/2015 | Nishimaki | G06T 7/73 |
| | | | 345/633 |
| 2015/0121432 A1* | 4/2015 | Pandey | H04N 21/43615 |
| | | | 725/78 |
| 2015/0371276 A1* | 12/2015 | Niyogi | G06Q 30/0267 |
| | | | 705/14.1 |
| 2016/0234345 A1* | 8/2016 | Roberts, Jr. | H04L 67/306 |
| 2019/0279407 A1* | 9/2019 | McHugh | G06F 3/048 |
| 2020/0271932 A1* | 8/2020 | Tuomisto | G06T 19/006 |
| 2020/0278544 A1* | 9/2020 | Poulad | G02B 6/4214 |

FOREIGN PATENT DOCUMENTS

| | | |
|---|---|---|
| JP | 2014220572 A | 11/2014 |
| WO | 2016053906 A1 | 4/2016 |

OTHER PUBLICATIONS

Examination Report for corresponding EP Application No. EP 17783552.7, 6 pages, dated Apr. 24, 2020.

International Search Report and Written Opinion for corresponding PCT Application No. PCT/GB2017/052970, 13 pages, dated Dec. 15, 2017.

Brett R Jones et al., "IllumiRoom: Peripheral Projected Illusions for Interactive Experiences" Session: Interacting around Devices: Human Factors in Computing Systems. ACM, pp. 869-878, dated Apr. 23, 2013.

Combined Search and Examination Report for corresponding GB Application No. GB1618028.3, 4 pages, dated Mar. 23, 2017.

Notification for Reasons for Refusal for corresponding JP Application No. 2019-522451, 8 pages, dated Aug. 25, 2021.

* cited by examiner

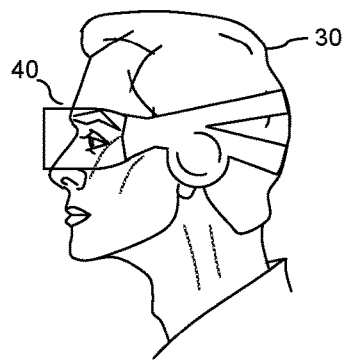 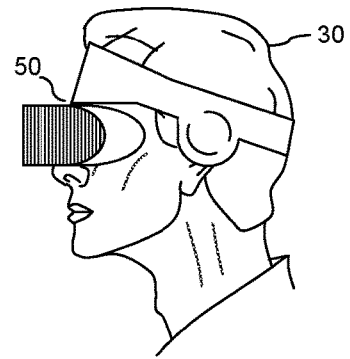
Figure 3A                Figure 3B
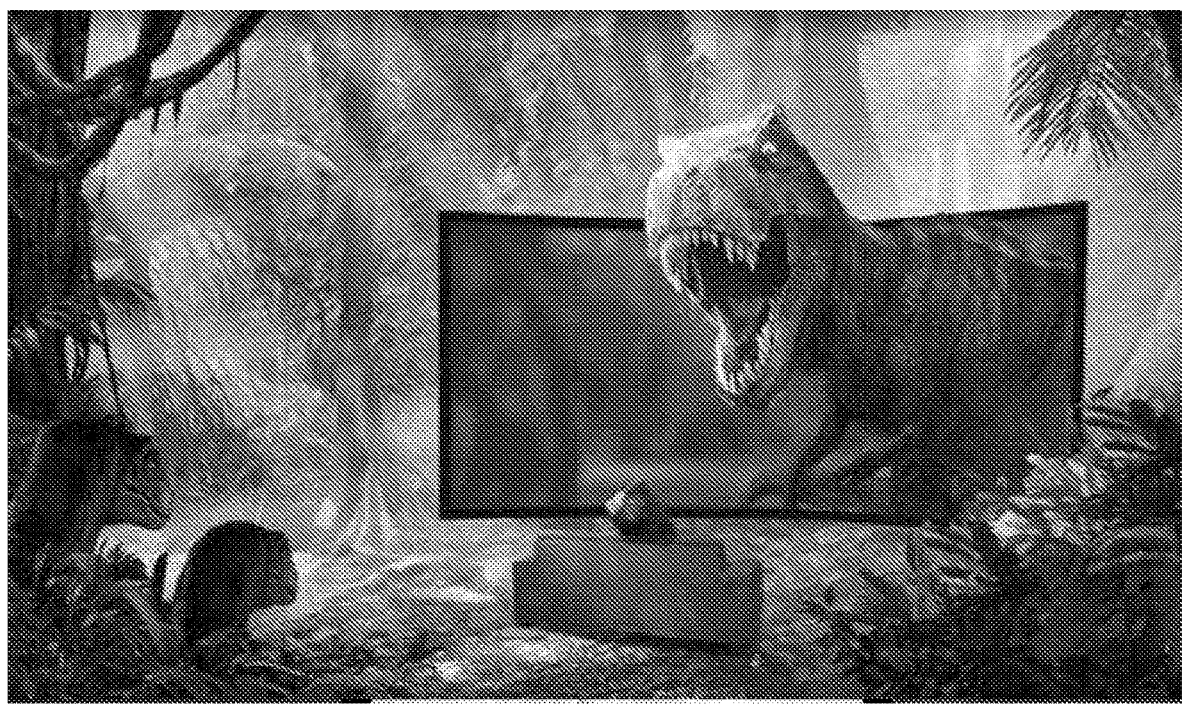
Figure 4

VIDEO CONTENT SYNCHRONISATION METHOD AND APPARATUS

BACKGROUND

The present invention relates to a video content synchronisation method and apparatus.

Conventional TV displays allow users to watch video content, but they must do so on a screen of limited size, for example in comparison to the size of a cinema screen. This can diminish the user's experience of the content.

More recently, virtual reality headsets such as the Sony PlayStation VR®, more generally referred to as head mounted devices or HMDs, provide a means of displaying such video content separately to the left and right eyes of the user, and by controlling the effective size of the image in front of the user's eyes and a positional offset between the left and right images, this can create the illusion of looking at a screen of arbitrary size at a given distance. In this way, the cinematic experience can be recaptured.

SUMMARY

However, there is still scope to further enrich the user's experience of the content.

The present invention seeks to address this issue.

In a first aspect, a method of video content synchronisation is provided in accordance with one or more embodiments herein.

In another aspect, an apparatus for video content synchronisation is provided in accordance with one or more embodiments herein.

Further respective aspects and features of the invention are defined in the appended claims.

BRIEF DESCRIPTION OF THE DRAWING

Embodiments of the present invention will now be described by way of example with reference to the accompanying drawings, in which:

FIG. 3A is a schematic diagram of an augmented reality headset in accordance with an embodiment of the present invention.

FIG. 3B is a schematic diagram of a virtual reality headset in accordance with an embodiment of the present invention.

FIG. 4 is an illustrative diagram of video content in a first display and virtual environment content in a second separate display within a virtual viewing space in accordance with an embodiment of the present invention.

DETAILED DESCRIPTION OF THE INVENTION

A video content synchronisation method and apparatus are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Overview

Figure 1:
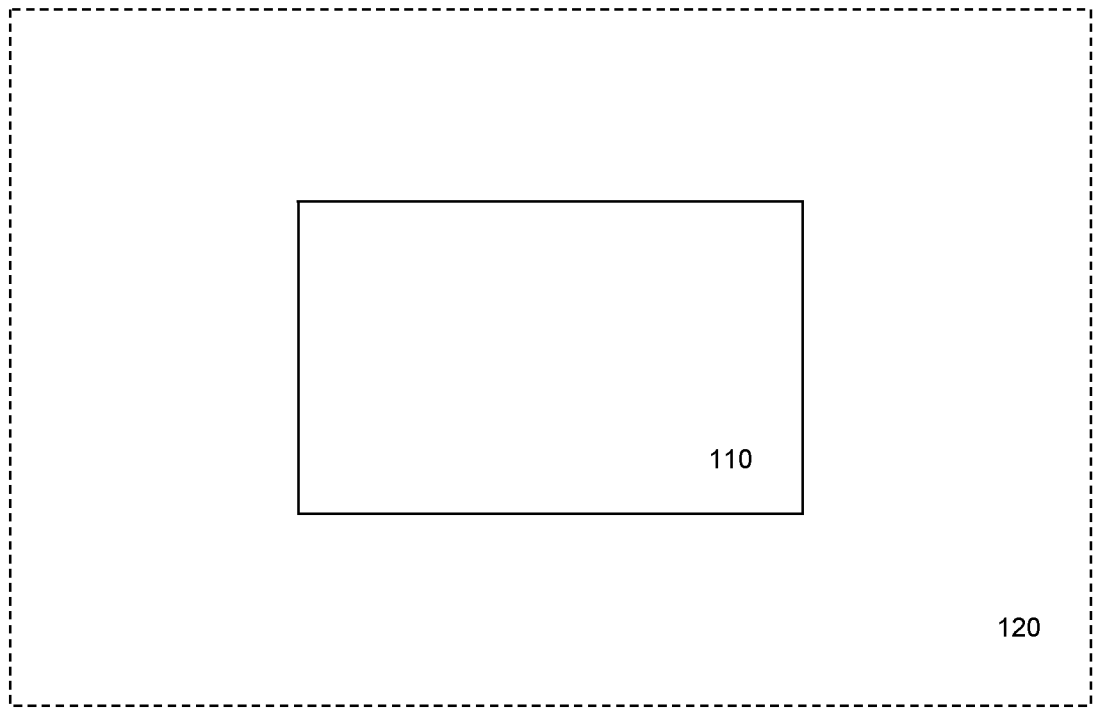
FIG. 1 is a schematic diagram of a first display and a second display in accordance with an embodiment of the present invention.

Referring now to FIG. 1, in an embodiment of the present invention video content is displayed to a user on a first display (110), such as a television, or potentially a virtual screen occupying a predetermined region within a viewing space presented by a virtual reality head mounted display. The video content can be 2D or 3D, and is typically pre-recorded, although it could be live (e.g. via a webcam).

Figure 2:
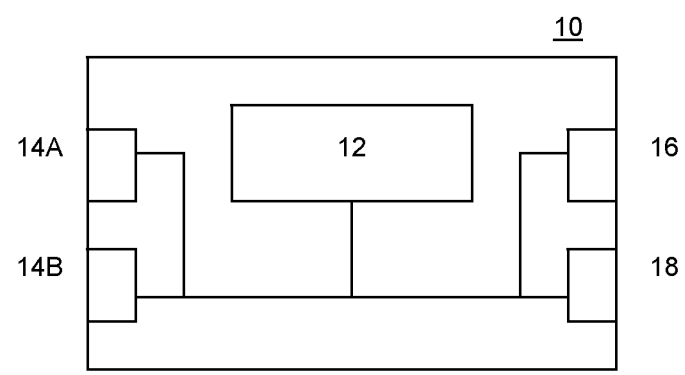
FIG. 2 is a schematic diagram of an entertainment device in accordance with an embodiment of the present invention.

Referring now also to FIG. 2, in addition a virtual environment is generated that is separate from the video content, for example by a videogame console 10 or equivalent general-purpose computer operating under suitable software instruction such as the PlayStation 3® or PlayStation 4®.

In embodiments of the present invention, the virtual environment has been designed to visually relate to at least part of the video content, as will be explained in more detail later herein.

At least part of the virtual environment is then displayed to the user—but not on the first display, as will be explained in more detail later herein.

Meanwhile, the video content is associated with cue timing data which indicates the occurrence of one or more predetermined cues associated with respective predetermined times during the course of video content playback. The entertainment device detects when such queues occur.

In response to a detected cue, the displayed state of the at least part of the virtual environment then changes synchronously with the cue and hence the video content, as will be explained in more detail later herein.

As will be explained in more detail herein, this allows a device implementing the above described techniques to expand the viewer's experience beyond the video content on their conventional main display by providing a complementary virtual environment surrounding, adjacent to or indeed separate from the main display, which can change in response to cued moments within the video content. In turn this can enable non-interactive pre-recorded content to become interactive by providing passive or interactive supplementary models and the like at appropriate moments during playback of a video (for example, a virtual teacher), or can extend the reach of selected aspects of the pre-recorded video beyond the television, for example in the form of explosion debris modeled on the virtual environment and timed to continue the trajectory of debris visible within the pre-recorded video shown on the main display as it reaches the edge of that display. Other uses for the apparatus and techniques described herein will be apparent to the skilled person.

The Second Display

As noted previously herein, the at least part of the virtual environment is displayed to the user, but not on the first display used for the video content.

Rather, an alternative display means is used. In the case where the first display is a physical display such as a television, a projector may be used to project the at least part of the virtual environment onto a surface distinct from the television. Similarly, and referring to FIG. 3A, an augmented reality headset 40 (which allows the user 30 to see the physical television) may be used to display the at least part of the virtual environment at a position that appears to correspond to said surface distinct from the television.

Alternatively, and referring to FIG. 3B, where the first display is a predetermined region within the virtual viewing space presented by a virtual reality head mounted display 50, then the alternative display means may correspond to an area of the virtual viewing space outside the predetermined region of virtual viewing space occupied by the first display.

The videogame console comprises a processor 12 (typically a central processor, typically in conjunction with a graphics processor, not shown) operable to generate the virtual environment, and supply it to the alternative display means through a video output port 14A (for example an HDMI® port).

Optionally the videogame console is also the source for the video content. The video content may be supplied on a physical medium such as a disc (not shown), or may be stored in memory (not shown) or may be streamed from a network such as the Internet via a network communications input 16, such as an Ethernet® or Wi-Fi® port. In this case, the videogame console may output the video content via a second video output port 14B (for example an HDMI® port). It will be appreciated however that where the first display and additional display are logically separate displays within a common viewing space accessed by a head-mounted display, then both the at least part of the virtual environment and the video content may be output through the same video output port to the head-mounted display.

It can be assumed that for physical displays, the first display and the second display are different types of device; hence typically the first display will be a living room television or the like, and the second display will be a projector, mobile phone or tablet. However, in principle the second display could also be a television (for example an older television previously replaced by the current first display).

Cue Detection

As was noted previously, the video content has one or more predetermined cues associated with it at corresponding predetermined times.

Each cue indicates that there is to be a change in the status of the display of the virtual environment to the user.

The cue data may be embedded within the video data, depending upon the standard used to encode the video data. Hence for example each video frame may comprise space within a header or other portion of data for non-standard data to be included by the content provider, broadcaster etc., generically referred to herein as 'user fields'. During playback of the video content successive frames are accessed/decoded, and in an embodiment of the present invention one or more frames within the video content comprises embedded cue data in one or more such user fields. Because the frames comprising cue data occur at predetermined times within video playback, the predetermined timing of the cues is automatically provided by embedding them in the relevant frame(s).

Depending on the space available within the user fields of the video data, the cue data may comprise details of what change of status in the virtual environment should occur in response to the cue. However typically the amount of data available in the user field(s) of any one video frame is smaller than that which would be required to fully specify how the videogame console should change the status of the displayed virtual environment.

Consequently, optionally this information could be distributed across a plurality of frames, signaled by a cue start flag or marker in a user field of one frame, and ending with a cue end flag or marker in a user field of a subsequent frame. The frame containing the cue end flag or marker is selected to occur at the desired time to enact the change in status of the displayed virtual environment. The videogame console could then accumulate the specification for the change of status of the displayed virtual environment over the course of these frames, in order to implement it in response to the cue end flag and hence at the appropriate time.

Alternatively, optionally the cue data may simply provide an indicator that a cue occurs in this frame, and hence provides the desired timing. The indicator may explicitly identify the cue, for example using some identification code, or may comprise a cue counter that increments through the video content with each cue. Alternatively it may simply be a flag, with any associated cue counting or cue identification occurring at the videogame console.

Alternatively, the queue data may not be embedded within the video data at all. Instead it may be provided as a separate file associated with the video content, for example by being located on the same disc as a video content, or included in a set of files comprising the video data, or being located at a URL indicated by the video data, or being held by a service provider operable to identify the video data and retrieve the relevant queue data for use by the entertainment device.

In such a case, the cue data may comprise a list of one or more predetermined cue times, optionally together with respective counts or IDs. The entertainment device is then arranged to receive or monitor the current playback time, or count the time from the start of playback, and compare this time during playback with the respective predetermined cue times to identify the occurrence of a cue.

In each of these cases, the individual cue is then associated with appropriate instructions for changing the status of the displayed virtual environment, for example using a lookup table.

Change of Status

Where each cue has a unique ID or count, this ID or count can be found in the look up table and the corresponding instruction data for changing the status can be identified. Where the cue is simply a flag or timestamp, then entries in the look up table can be accessed sequentially in response to the detection of successive cues.

The instruction data in the look up table may comprise for example script data for implementing a series of changes to the state of the virtual environment, or may in turn indicate where such script data may be found; hence for example the entry in the lookup table may comprise a URL or filename for a script, or an identifier recognised by the entertainment device as corresponding to a particular scripted behaviour already built into the software generating the virtual environment. The look up table may also contain a combination of these.

A change in state specified by such instructions may take the form of activating or deactivating the display of at least part of the virtual environment to the user, activating or deactivating display of an additional part of the virtual environment to the user (i.e. having multiple separate areas of display in addition to the first display), modifying the contents of the virtual environment, for example by adding and/or animating an object or character within the virtual environment, or changing their position behaviour, or changing the position/viewpoint of a virtual camera used to generate the or each display of the virtual environment.

Hence for example a first cue may correspond in the look up table to an instruction for the entertainment device to begin the display of at least part of the virtual environment, with the environment itself beginning in a default state. A second cue may correspond in the look up table to an instruction to move the virtual camera to a different position within the virtual environment, hence for example making a new object or character in the virtual environment visible. The third cue may correspond to instruction data identifying a script (either as a separate file or already built into the software generating the virtual environment), for example to cause the object or character to exhibit certain behaviours (such as an animation), and optionally to also playback associated sound (so that for example a character appears to wave and talk to you). In this way for example, guided interactivity with pre-recorded video content may be facilitated.

In another example, an aeroplane within the video content may appear to move out of shot within the video content. As it begins to do so, a cue associated with that moment in the video content corresponds in the look up table with an instruction to animate and display a virtual model of that aeroplane, so that to the user it appears as though the aeroplane flies out of the video content in the first display and, into the virtual environment. Similar effects could be used to explosions, car chases etc. For pre-recorded video material, this can provide an unexpected and entertaining enhancement of the user's experience.

It will be appreciated that where the change in state the virtual environment requires an action by the entertainment device that may take more than a predetermined period of time to achieve (for example, more than N frames, where N is 1, 2, 3, 4, 5, 10, 25 or more as applicable), then optionally a cue may comprise two parts, with a first cue being associated with instructions to load the relevant information and/or prepare the change in state, which will take the majority of time, and the second cue being to enact it, which should occur within the preferred N frames. Typically N will be 1 or 2 for situations where the virtual environment is already running within the entertainment device. It will be appreciated that N may depend upon the nature of the change in state; for example turning the second display on or off may be assumed to take a number of seconds and hence N may equal 50, 100 or more; meanwhile changing virtual camera position or animating an entity within the virtual environment can be assumed to be achievable within the same video frame or the next.

Display Arrangements

As noted previously herein, the state of the displayed virtual environment will typically visually relate to the displayed video content. For example, it may provide a backdrop framing the displayed video content, in the form of a static, animated or interactive wallpaper (for example in 2D) or background (for example in 3D). More generally, the virtual environment is thus a graphical environment (typically in either a 2D or 3D virtual space) that has been designed to visually relate to at least part of the video content.

Optionally, such a graphical virtual environment may be arranged to surround the display of the video content item. An illustration of the effect is provided in FIG. 4 for the case of a virtual reality headset, where 3D video content of a dinosaur is displayed on a first display as a predetermined area of a virtual viewing space, and a jungle setting is provided as a background visible in other areas of the virtual viewing space. A similar effect can be provided physically by aligning a projector to project an image on towards a television that is the first display, but displaying a black rectangle coincident with the television so that it does not interfere with the primary display. The size and position of the black rectangle can be determined during the calibration stage. Entertainment device can then generate the virtual environment, with the black rectangle as a final overlay, and display this through the projector. The effect will then be similar to that shown in FIG. 1.

A similar effect can again be provided for an AR head mounted display, but this time the brightness of the television screen can be used to detect its location dynamically as the user's head moves (potentially in conjunction with any other tracking technology provided by the device), and graphical overlays presented to the user through the display are arranged to surround but not overlap the TV screen, for example by setting transparency to full for pixels in the region of the displayed AR image currently coincident with the user's view of the television.

Figure 5:
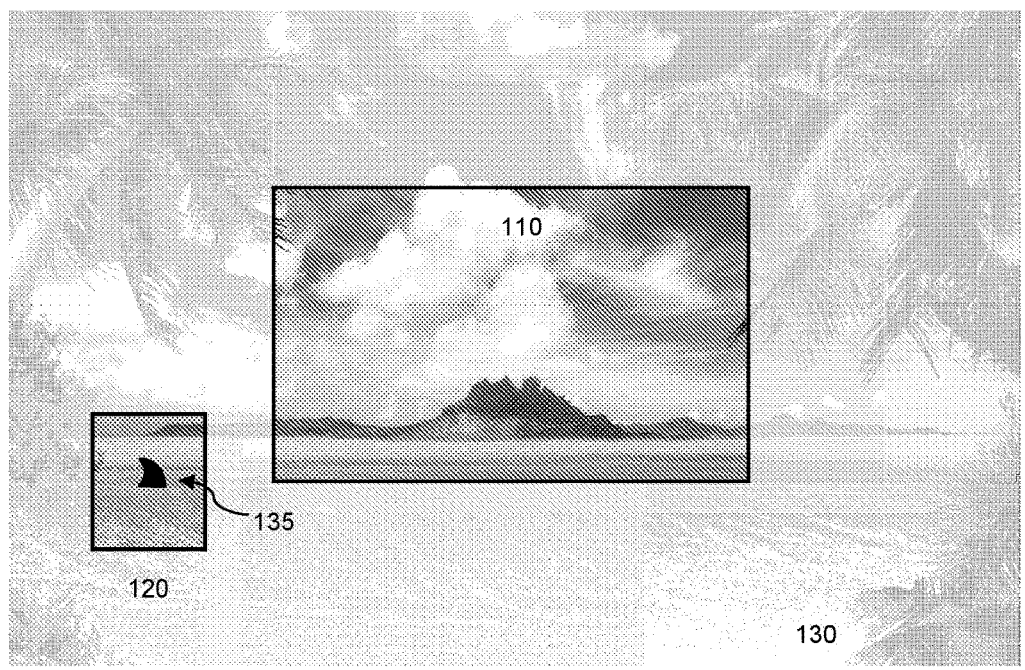
FIG. 5 is a schematic diagram of a first display showing video content and a second display showing a respective view of a virtual environment that visually relates to the video content, in accordance with an embodiment of the present invention.

It will be appreciated however this is not the only possible arrangement. Referring to FIG. 5, in an embodiment of the present invention, where the first display 110 is a television, the second display 120 may be a mobile phone, tablet or other handheld device comprising accelerometer/gyroscopic motion detection and/or a video camera. Using accelerometers, gyroscopes and/or optical flow motion detection, such a device can determine the direction that the device is facing. Consequently, by running a suitable app on the second display device that informs the entertainment device where the second display is pointing, the entertainment device can provide to the second display a render of the virtual environment 130 in the region of the virtual viewing space corresponding to the screen of the device. In this way, the user may look around a scene surrounding the first display device, for example to find secrets (so-called 'easter eggs') 135, or other complimentary items, such as for example a monster standing behind the user during a scary movie that they will only discover if they choose to look behind them with their second screen.

Environmental Assets

The virtual environment associated with video content may be generic or comprise generic or stock objects, characters, and/or entities, and consequently may be preloaded on the entertainment device. Alternatively or in addition, environmental assets specific to a virtual environment in association with the video content may be required; for example particular face textures for characters, or backdrops may be used in conjunction with stock assets, or an entirely new virtual environment with its own assets may be provided.

Such assets may be stored in conjunction with the video content, for example on a disc or within a file structure on-line, or may be held in association with the video content by a service provider such as a video streaming service, and/or a location for the assets may be identified within a user field of the video content, for example in the form of a URL.

In this way, video content can make use of stock virtual environments, modified stock virtual environments or bespoke virtual environments as applicable and as desired by a designer, and assets required for these virtual environment can be obtained either in conjunction with the video content or by inspection of predetermined user fields of the video content.

It will be appreciated that typically the environmental assets will be larger than the instruction data used to specify changes in state of the virtual environment. Consequently in some circumstances it may be that the instruction data can be included with the video content but the assets cannot, or vice versa; similarly it may be that instructions are included with the video content, but assets are provided on-line so that assets with different resolution/fidelity can be selected for different playback/display devices to reflect their processing and graphics capabilities.

Similarly, whilst instruction data may be associated with or packaged with the video content, virtual environment assets may be held separately so that they need to be accessed once, for example to reduce storage overheads in the case of a television series where the same graphics can be used for multiple episodes but with different corresponding behaviours.

It will be appreciated that any combination of these approaches may be used; for example a television series may be packaged with a baseline set of environmental assets common to most episodes, together with a (correspondingly smaller) set of supplementary environmental assets being provided for individual episodes.

Similarly, newly released video content may include queue timings, instructions and virtual environment assets as appropriate; meanwhile previously released and legacy video content may be supported by provision of cue timing, instruction data and virtual environment assets as separate downloadable materials that can synchronise with the existing video content through monitoring or counting the playback time of that material as described previously herein.

Variations

It will be appreciated that the present invention is not limited to just one secondary display; for example in a VR or AR implementation, the virtual environment displayed in a non-overlapping region surrounding the primary display may be generated to a higher quality than a separate display of the virtual environment or a complementary virtual environment located opposite the primary display (i.e. behind the user). Similarly, in a physical setup where a projector is used to enhance the region surrounding a physical TV, separately a handheld device such as a phone or tablet may be used to explore beyond the limits of the projection area, or for example to act as a magnifying glass, enabling inspection of features within the projection area by transmitting a render of a subsection that area as a closer virtual camera position, and/or higher resolution than the corresponding projected portion of the virtual environment.

Similarly, it was noted previously herein that the video content is pre-recorded. This enables the queues and the changes to the virtual environment to be prepared in advance. However, in principle it is possible to do this with live video, for example during a video chat or similar; hence for example a first user, streaming web cam video of themselves to a friend may press a button or select a menu item that transmits cue information in association with the video to a recipient that specifies some enhancement of their web cam video, for example by selecting a scene to surround their video such as sunny park land or a dark alley, to convey their mood. By transmitting cues in response to user selections in this manner, users can enhance their transmitted video dynamically; for example when signing off and saying 'I love you', they may select for animated hearts to appear above the recipient's television.

However, it will be appreciated that in either the case of pre-recorded video content or live video content the video content displayed on the first display is not generated or derived from the virtual environment shown on the second or ancillary display; in other words they do not have a common generative source and do not merely represent two views of the same environment. However, in principle there is nothing to prevent the present invention also displaying separate augmentations superposed on the pre-recorded video content as an additional step separate to the previously discussed provision of a non-overlapping display of some or all of a virtual environment complementing the video content on the first display.

Figure 6:
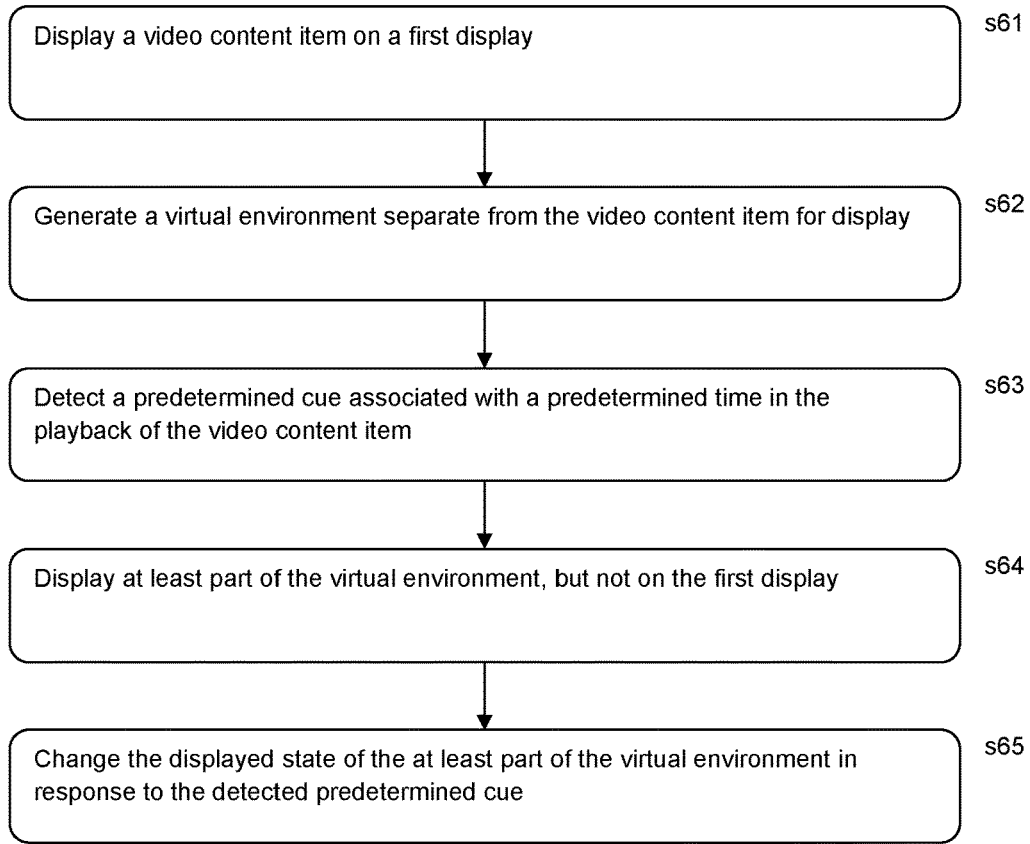
FIG. 6 is a flow diagram of a method of video content synchronisation, in accordance with an embodiment of the present invention.

Hence referring now to FIG. 6, in a summary embodiment of the present invention, a method of video content synchronisation comprises:

in a first step S61, displaying a video content item on a first display (110), such as a television or a predetermined area of a virtual viewing space, as discussed previously;

in a second step S62, generating a virtual environment (130) separate from the video content item for display, wherein 'virtual environment' may simply comprise a virtual object at a chosen position within a virtual, coordinate system, which a virtual camera placed within the same coordinate system can view, but may optionally be a virtual environment of arbitrary complexity and/or size, for example similar to that of a videogame;

in a third step S63 detecting a predetermined cue associated with a predetermined time in the playback of the video content item, for example in the form of cue data embedded within a user field of a video frame, where that cue data may comprise a unique identifier, a counter or simply a flag, or in the form of separately listed cue timings for comparison with elapsed playback of the video content; and in a fourth step S64, displaying at least part of the virtual environment, but not on the first display, for example as mentioned previously herein by use of a projector, an AR headset or VR headset, or a mobile screen such as a phone or tablet (120);

wherein the displayed state of the at least part of the virtual environment changes in response to the detected predetermined cue, for example causing or ceasing display the virtual environment, changing the content or behaviour of at least part of the virtual environment, or changing the viewpoint or field of view of a virtual camera used to render the displayed at least part of the virtual environment.

In an instance of the summary embodiment, the first displays a real-world physical display. In this instance, the at least part of the virtual environment is displayed by one selected from the list consisting of a projector, an augmented reality display device, and a mobile display device (e.g. a phone or tablet).

In an instance of the summary embodiment, the video content item and the at least part of the virtual environment are displayed by a virtual reality display device; and the first display occupies a predetermined region within a viewing space presented by the virtual reality display.

In an instance of the summary embodiment, the displayed at least part of the virtual environment is displayed in a non-overlapping manner with the video content item. In this instance, the displayed at least part of the virtual environment is displayed to surround the display of the video content item.

In an instance of the summary embodiment, the associated cue is accessible separately to the video content item, for example as a list of predetermined cue timings against which the current playback time of the video content item is compared, and identifying a particular cue as when the current playback time matches a corresponding predetermined cue time.

Alternatively, in an instance of the summary embodiment the or each predetermined cue is embedded in the video content item.

In an instance of the summary embodiment, the method also comprises the steps of accessing instruction data corresponding to a respective predetermined cue, where said instruction data comprises one or more instructions indicating the respective manner in which the displayed state of the at least part of virtual environment should change in response to the respective predetermined cue; and implementing the change in response to the or each instruction. As noted previously, this instruction data may be incorporated into the video data or more typically may be provided separately and associated with the cue data via a lookup table.

In an instance of the summary embodiment, the method comprises the step of accessing asset data comprising one or more virtual assets used for the generation of the virtual environment. As noted previously, this asset data may comprise generic assets and bespoke assets for a particular video content item, and furthermore bespoke assets may be provided as separate, resources, for example providing a basic set of resources for a TV series (for example embellishments to the title sequence, a characteristic scene from the series as a background, and/or a themed 'picture-frame' decoration to surround the screen) together with subsequent separate resources for each episode (for example relating to unique scenes or events within that episode). In this case, as noted previously herein the asset data may be accessed separately to instruction data indicating the respective manner in which the virtual environment should be modified in response to a respective predetermined cue.

Finally in an instance of the summary embodiment, the first video content item is pre-recorded video. However as noted previously herein, potentially the video content item may be live streamed video. However it is not envisaged that the video content item does not have a common generative source in the virtual environment displayed outside the first display.

In another summary embodiment of the present invention, apparatus for video content synchronisation comprises output means (14B) arranged to output first video content for a first display (110); a processor (12) arranged to generate a virtual environment (130) for display that is separate from the first video content; output means (14A, 14B) arranged to output at least part of the virtual environment for a second display (120); and a cue detector (12) arranged to detect a predetermined cue associated with a predetermined time in the playback of the first video content; wherein the processor is arranged to modify the displayed state of at least part of the virtual environment in response to the detected predetermined cue.

It will be appreciated that variations in the above apparatus are envisaged to implement the methods described herein as applicable, including but not limited to the first display being a real-world physical display; the at least part of the virtual environment being displayed by one of a projector, an augmented reality display device, and a mobile display device; the first video content and the at least part of the virtual environment being displayed by a virtual reality display device, where the first display occupies a predetermined region within a viewing space presented by the virtual reality display; the displayed at least part of the virtual environment being displayed in a non-overlapping manner with the video content item, for example surrounding the display of the video content item; the associated cue being accessible separately to the video content item, for example by detecting a current playback time of the video content item, comparing the current playback time with one or more predetermined times associated with respective predetermined cues, and identifying a predetermined cue as when the current playback time matches a corresponding predetermined time; the or each predetermined cue being embedded in the video content item; having means to access instruction data corresponding to a respective predetermined cue, said instruction data comprising one or more instructions indicating the respective manner in which the displayed state of the at least part of virtual environment should change in response to the respective predetermined cue, and means to implement the change in response to the or each instruction; having means to access asset data comprising one or more virtual assets used for the generation of the virtual environment, where for example the asset data may be accessed separately to instruction data indicating the respective manner in which the virtual environment should be modified in response to a respective predetermined cue; and in which the first video content item is pre-recorded video.

It will be appreciated therefore that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The invention claimed is:

1. A method of video content synchronisation, comprising the steps of:
    displaying a video content item on a first display, which is a real-world physical display;
    generating a virtual environment separate from the video content item for display, the virtual environment being a graphical visual environment designed to visually relate to at least part of the video content;
    detecting a predetermined cue associated with a predetermined time in the playback of the video content item; and
    displaying at least part of the virtual environment, but not on the first display, by way of a projector; wherein
    the displayed state of the at least part of the virtual environment changes in response to the detected predetermined cue,
    the projector emits a black rectangle coincident with the first display such that the displayed at least part of the virtual environment is displayed in a non-overlapping manner with the video content item, and
    the displayed at least part of the virtual environment is displayed to surround the display of the video content item.

2. The method of claim 1, in which the at least part of the virtual environment is displayed by at least one of: an augmented reality display device; and a mobile display device.

3. The method of claim 1, wherein the video content item and the at least part of the virtual environment are displayed by a virtual reality display device; and the first display occupies a predetermined region within a viewing space presented by the virtual reality display.

4. The method of claim 1, in which the associated cue is accessible separately to the video content item.

5. The method of claim 4, comprising the steps of:
detecting a current playback time of the video content item;
comparing the current playback time with one or more predetermined times associated with respective predetermined cues; and
identifying a predetermined cue as when the current playback time matches a corresponding predetermined time.

6. The method of claim 1, in which each predetermined cue is embedded in the video content item.

7. The method of claim 1, comprising the steps of:
accessing instruction data corresponding to a respective predetermined cue, said instruction data comprising one or more instructions indicating the respective manner in which the displayed state of the at least part of virtual environment should change in response to the respective predetermined cue; and
implementing the change in response to the or each instruction.

8. The method of claim 1, comprising the step of: accessing asset data comprising one or more virtual assets used for the generation of the virtual environment.

9. The method of claim 8, in which the asset data is accessed separately to instruction data indicating the respective manner in which the virtual environment should be modified in response to a respective predetermined cue.

10. The method of claim 1, in which the first video content item is pre-recorded video.

11. A non-transitory, computer readable storage medium containing computer executable instructions, which when executed by a computer system, cause the computer system to carry out actions, comprising:
displaying a video content item on a first display, which is a real-world physical display;
generating a virtual environment separate from the video content item for display, the virtual environment being a graphical visual environment designed to visually relate to at least part of the video content;
detecting a predetermined cue associated with a predetermined time in the playback of the video content item; and
displaying at least part of the virtual environment, but not on the first display, by way of a projector; wherein
the displayed state of the at least part of the virtual environment changes in response to the detected predetermined cue,
the projector emits a black rectangle coincident with the first display such that the displayed at least part of the virtual environment is displayed in a non-overlapping manner with the video content item, and
the displayed at least part of the virtual environment is displayed to surround the display of the video content item.

12. An apparatus for video content synchronisation, comprising:
output circuitry arranged to output first video content for a first display, which is a real-world physical display;
a processor arranged to generate a virtual environment for display that is separate from the first video content, the virtual environment being a graphical visual environment designed to visually relate to at least part of the video content;
output circuitry arranged to output at least part of the virtual environment for displaying on a second display, but not on the first display by way of a projector; and
a detector arranged to detect a predetermined cue associated with a predetermined time in the playback of the first video content; wherein
the processor is arranged to modify the displayed state of at least part of the virtual environment in response to the detected predetermined cue,
the projector emits a black rectangle coincident with the first display such that the displayed at least part of the virtual environment is displayed in a non-overlapping manner with the video content item, and
the displayed at least part of the virtual environment is displayed to surround the display of the video content item.

* * * * *